United States Patent
Tomobe et al.

(10) Patent No.: US 7,268,323 B2
(45) Date of Patent: Sep. 11, 2007

(54) HEAT TREATING APPARATUS AND HEAT TREATING METHOD FOR SHEET-LIKE ARTICLE

(75) Inventors: Hitoshi Tomobe, Hiroshima (JP); Hirotoshi Mizota, Tokyo (JP); Hajime Okutsu, Hiroshima (JP); Tomonari Murakami, Hiroshima (JP); Daisuke Morimoto, Toyama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 12 days.

(21) Appl. No.: 10/547,554

(22) PCT Filed: Feb. 27, 2004

(86) PCT No.: PCT/JP2004/002356

§ 371 (c)(1),
(2), (4) Date: Sep. 1, 2005

(87) PCT Pub. No.: WO2004/078450

PCT Pub. Date: Sep. 16, 2004

(65) Prior Publication Data

US 2006/0157468 A1    Jul. 20, 2006

(30) Foreign Application Priority Data

Mar. 4, 2003  (JP)  ............................. 2003-057362
Mar. 14, 2003 (JP)  ............................. 2003-069880

(51) Int. Cl.
*H05B 1/02*       (2006.01)
(52) U.S. Cl. ..................... 219/494; 219/388; 34/448; 34/443

(58) Field of Classification Search ................ 219/388, 219/494, 497, 501, 506, 483–486; 34/443, 34/448
See application file for complete search history.

(56) References Cited

U.S. PATENT DOCUMENTS 2,848,820 A * 8/1958 Werner et al. ................ 34/461
4,779,357 A * 10/1988 Troetscher ................... 34/638
4,809,446 A * 3/1989 Langer ........................ 34/640
5,579,072 A * 11/1996 Frank et al. ................. 396/579

FOREIGN PATENT DOCUMENTS

| JP | 04-363580   | 12/1992 |
| JP | 05-106964   | 4/1993  |
| JP | 2001-054746 | 2/2001  |
| JP | 2001-091162 | 4/2001  |
| JP | 2002-069832 | 3/2002  |

* cited by examiner

*Primary Examiner*—Mark Paschall
(74) *Attorney, Agent, or Firm*—Oblon, Spivak, McClelland, Maier & Neustadt, P.C.

(57) ABSTRACT

To be provided are a heat treatment apparatus having blocking members which block gaps between the side walls of nozzle boxes provided with slit nozzles, whose size in the lengthwise direction is greater than the width of a sheet, and the side walls of a heat treatment chamber, and gas having a uniform velocity fluctuating no more than ±25% in the lengthwise direction of the slit nozzles is blown out of the slit nozzles to subject the sheet to heat treatment, resulting in little unevenness of temperature in the widthwise direction and reduced energy loss, and a heat treatment method using this heat treatment apparatus.

4 Claims, 4 Drawing Sheets

HEAT TREATING APPARATUS AND HEAT TREATING METHOD FOR SHEET-LIKE ARTICLE

TECHNICAL FIELD

The present invention relates to a heat treatment apparatus for subjecting sheets to heat treatment by consecutively heating or cooling them. In particularly, it can be effectively utilized by a heat treatment method permitting consecutive heat treatment of sheets, such as resin sheets, by heating or cooling them uniformly in their widthwise direction.

BACKGROUND ART

The known prior art for subjecting resin sheets to heat treatment includes a treatment apparatus of a system in which gas is let flow in parallel to the surface of sheets (see for instance the Japanese Patent Application Laid-Open No. 4-363580). Another known apparatus uses a system in which hot air is blown on both surfaces of sheet-shaped bases from slit-shaped nozzles (see for instance the Japanese Patent Application Laid-Open No. 2002-69832). Incidentally, one example of slit-shaped nozzle is disclosed in the Japanese Patent Application Laid-Open No. 2001-54746, and one of sealing structure for openings of the sheet passage to prevent gas leaks from the inlet and outlet of sheets, in the Japanese Patent Application Laid-Open No. 5-106964.

However, the method described in the Japanese Patent Application Laid-Open No. 4-363580 involves a disadvantage that the temperature boundary layer formed in the gas phase near the resin sheet is thick and accordingly heat transfer between the resin sheet and the gas is not satisfactory. For this reason, in order to achieve heat treatment at a desired temperature, it is necessary either to hold the resin sheet in the heat treatment apparatus for an extended period or to raise the temperature of the hot air, which is detrimental to both productivity and energy efficiency.

By the method described in the Japanese Patent Application Laid-Open No. 2002-69832, though improved in heat transfer, it is extremely difficult to keep the height and angle of the sheet and the blocking member constant. Usually, the vertical distance between the sheet and the blocking plate fluctuates, resulting in a problem that wind velocity distribution differs between the middle and two sides of the resin sheet and accordingly temperature becomes uneven in the widthwise direction of the resin sheet. Temperature unevenness in the widthwise direction of the resin sheet adversely affects the quality of the resin sheet and therefore is undesirable.

In order to reduce unevenness of temperature in the widthwise direction of the resin sheet, the description of the invention disclosed in the Japanese Patent Application Laid-Open No. 2002-69832 refers to the formation of a reflux space to let hot air pass between adjoining nozzle boxes and fitting a flow-rectifying lattice in this reflux space thereby to make the velocity of the refluxed hot air uniform. However, since the flow of gas may greatly vary with gas velocity, gas temperature or apparatus structure, there still remains the disadvantage that variations in temperature distribution in the widthwise direction of the resin sheet with operating conditions cannot be prevented merely by installing a flow-rectifying lattice in the reflux space between adjoining nozzle boxes, and accordingly there is a call for a heat treatment apparatus less susceptible to temperature unevenness in the widthwise direction of heat-treated sheets, wherein steady uniformity of temperature in the widthwise direction of resin sheets can be achieved by a simpler method.

DISCLOSURE OF THE INVENTION

An object of the present invention, attempted in view of the above-described circumstance of the prior art, is to provide a heat treatment apparatus with less temperature distribution in the widthwise direction of heat-treated sheets and energy losses.

The present inventors, making intensive research to achieve the object stated above, discovered that, by providing a gas inlet part having nozzle boxes provided with slit-shaped nozzles (which may sometimes be referred to as slit nozzles) which blow out gas in a slit shape in a direction substantially orthogonal to the running direction of a sheet constituting the object of heat treatment, whose lengthwise direction is arranged to be substantially orthogonal to the running direction of the sheet, and whose lengthwise size is greater than the width of the sheet, and providing within a heat treatment chamber blocking members which are extended between the external walls at the two ends of the heat treatment chamber and block the gaps between the side walls of the heat treatment chamber and the side walls of the nozzle boxes, temperature unevenness in the widthwise direction of the sheet having undergone heat treatment can be reduced and energy loss can be thereby reduced; this discovery led to the completion of the present invention.

Thus the invention provides a heat treatment apparatus comprising at least a heat treatment chamber having an inlet and an outlet for a sheet in external wall portions at its two opposite ends; a gas inlet part for letting gas, which is a thermal medium, into the heat treatment chamber; a gas outlet part for discharging the gas out of the heat treatment chamber; and carrying means for running the sheet along a linear route connecting the sheet inlet and outlet within the heat treatment chamber, characterized in that; the gas inlet part has nozzle boxes which blow out gas in a slit shape in a direction substantially orthogonal to the running direction of the sheet, whose lengthwise direction is arranged to be substantially orthogonal to the running direction of the sheet, and whose lengthwise size is greater than the width of the sheet; the nozzle boxes blow out gas having a uniformity of gas velocity fluctuating no more than ±25% in the lengthwise direction of the nozzles; and the heat treatment chamber has blocking members which are extended between the external walls at the two ends of the heat treatment chamber and block the gaps between the side wall portions of the heat treatment chamber and the side walls of the nozzle boxes.

Also, it is preferable for the gas in the heat treatment apparatus according to the invention to be air adjusted to a prescribed temperature.

Further, it is preferable for the heat treatment apparatus according to the invention to have, installed within the nozzle boxes, flow-rectifying lattices whose rate of aperture area is 70% or more, whose aperture pitch P is from 5 to 50 mm and whose height Z satisfies the condition of $P \leq Z \leq 10 \times P$.

Further, it is preferable for the flow-rectifying lattices in the heat treatment apparatus according to the invention to be so installed that the minimum distance Y from them to the nozzles be $0.5 \times P \leq Y \leq 10 \times P$.

Further, it is preferable for the gas inlet part in the heat treatment apparatus according to the invention to have a plurality of nozzle boxes, the nozzle boxes being so arranged to have gaps between them to allow gas to pass.

Further, it is preferable for the nozzle boxes in the heat treatment apparatus according to the invention to be so arranged as to satisfy the condition of $h \leq 40 \times D$, where D is the slit width of the slit nozzles and h is the distance from the tips of the slit nozzles to the sheet.

Further, it is preferable for the nozzle boxes in the heat treatment apparatus according to the invention to be provided with N slit nozzles, where N is not smaller than 2 but not greater than 29, and are so arranged as to satisfy the condition of $N \times D \leq h \leq 30 \times D$.

Further, it is preferable for the heat treatment apparatus according to the invention to be so provided with slit nozzles that the nozzle angle, which is an acute angle formed between the direction from the slit nozzles toward the sheet, the direction being parallel to that of the slit nozzles, and the running direction of the sheet be in a range of 30° to 90°.

Further, the invention provides a method for heat treatment of sheets whereby any of the heat treatment apparatus described above is used to subject a sheet to heat treatment by blowing gas of 1 to 200 m/s in velocity from the slit nozzles of the nozzle boxes.

It is preferable for the gas inlet part in the heat treatment apparatus according to the invention to be provided with nozzle boxes both over and underneath the sheet.

It is preferable for the sheet in the heat treatment apparatus according to the invention to be a resin sheet held between a pair of belts.

It is preferable for the heat treatment method according to the invention to be applied to a resin sheet held between a pair of belts.

BEST MODES FOR CARRYING OUT THE INVENTION

Preferred embodiments of the present invention will be described in detail below with reference to drawings. Incidentally, arrows in these drawings represent either the flow of gas or the running of a sheet.

Figure 1:
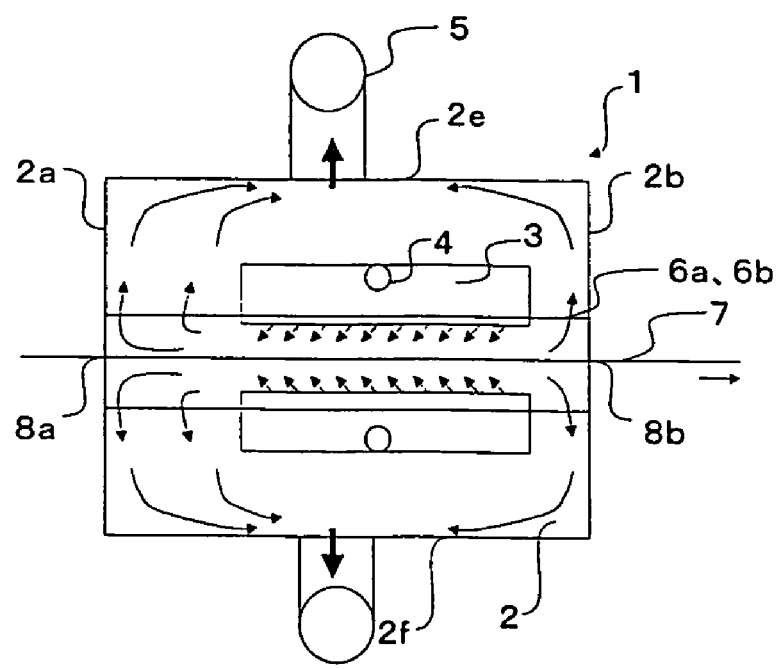
FIG. 1 schematically illustrates a longitudinal section of a heat treatment apparatus in an embodiment of the present invention.
Figure 2:
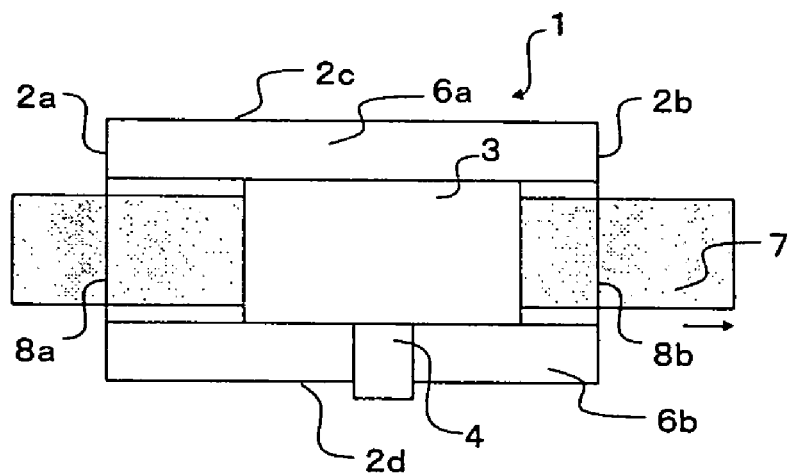
FIG. 2 schematically illustrates a plan of the heat treatment apparatus of FIG. 1.

FIG. 1 is a drawing for describing one example of heat treatment apparatus embodying the invention, schematically illustrating a longitudinal section of the heat treatment apparatus according to the invention; and FIG. 2 schematically illustrates a plan of this heat treatment apparatus.

For the purpose of the invention, there is no limit to a sheet 7 shown in FIG. 1 or FIG. 2, but any object shaped like what is commonly referred to as a sheet can be subject to heat treatment using a heat treatment apparatus 1 according to the invention. Specific examples of the sheet 7 include a sheet consisting of a resin material, a sheet consisting of a metallic material, a sheet consisting of a glass material, a sheet consisting of a ceramic material, and a sheet consisting of a paper or textile material. It can as well be a resin sheet held between metallic belts or a combination of any of the sheets mentioned above. The belts may be any known endless belts for use in a continuous casting process, and the sheet may be part of a sheet held between belts in the production process.

Any thin item like a film will be referred to as a sheet in the context of the present invention.

The aforementioned sheet 7 can be processed either intermittently or continuously in a heat treatment chamber 2. Where the sheet 7 is to be subjected to intermittent heat treatment, one or a plurality of sheet outlets and inlets are provided in external wall portions 2a and 2b at the two opposite ends of the heat treatment chamber 2; a sheet is carried into the heat treatment chamber 2 through a sheet inlet 8a and left at rest in the heat treatment chamber 2 to be subjected to heat treatment; after the lapse of a certain length of time, the sheet 7 can be taken out through a sheet outlet 8b. Or in continuous heat treatment, the inlet and outlet 8a and 8b for sheet 7 are provided in the external wall portions 2a and 2b at the two opposite ends of the heat treatment chamber 2, and the sheet 7 can be subjected to heat treatment by running along a linear route connecting the inlet and outlet in parallel to nozzle boxes 3. For the purpose of the invention, the running direction of the sheet 7 in the heat treatment chamber 2 may be referred to as the MD direction and the direction orthogonal to the running direction of the sheet 7, as the TD direction.

There is no limitation to the means of carrying sheets, but can be any appropriate known means, such as roller type or belt conveyor type.

Gas for the purpose of the invention is used as a heat medium for subjecting the sheet 7 to heat treatment by heating or cooling it, and there is no limitation to its choice only if the substance is gaseous under the conditions of the heat treatment and can serve the object of the invention. The gas for use in the heat treatment apparatus according to the invention can be appropriately selected according to the properties of the sheets to be subjected to heat treatment, the purpose of the heat treatment, the conditions of the heat treatment and so forth. Gases usable for the invention include air, inert gas such as nitrogen, exhaust gas from combustion and heating steam, but air is usually preferred.

The gas is used at normal temperature, or under heating with a heater or the like or under cooling with a cooler for adjustment to a prescribed temperature according to the purpose of the heat treatment.

Examples of heat treatment using gas at normal temperature that can be accomplished with the heat treatment apparatus according to the invention include cooling of a resin film after an elongation process, cooling of a resin sheet, cooling of a cast metallic sheet and cooling of a glass sheet.

Examples of heat treatment using heated gas that can be accomplished with the heat treatment apparatus according to the invention include heating of a resin film in an elongation process, heating of a resin sheet in an annealing process, and heating of a glass sheet. More specifically, when a polypropylene film is to be elongated for instance, the treatment is done in a temperature of 130 to 170° C. because the film has to be treated at a temperature not below the glass-transition temperature but not above the melting temperature of polypropylene.

Further, examples of heat treatment using cooled gas that can be accomplished with the heat treatment apparatus according to the invention include cooling of a resin sheet and cooling of electronic components. More specifically, when an electronic substrate is to be cooled by circulating inert gas, such as nitrogen, the gas is cooled to a range from 0° C. to normal temperature.

Where heat treatment is to be carried out using the heat treatment apparatus according to the invention, the velocity of gas blown out of nozzles provided on the nozzle boxes at the tips of the nozzles (which may be referred to as the gas velocity) is selected according to the type of the sheet to undergo heat treatment. Usually, the gas velocity is adjusted within a range of 1 to 200 m/s. Heat treatment is accomplished using the heat treatment apparatus according to the invention at a gas velocity of 1 to 20 m/s in cooling, for instance, an electronic substrate, 2 to 200 m/s in cooling a cast metallic sheet with gas of normal temperature, or 1 to 50 m/s in heating a resin sheet.

More specifically, where a resin film of about 300 μm in thickness is to be subjected to heat treatment (heated with gas of 50 to 200° C.) using the heat treatment apparatus according to the invention, a gas velocity of usually from 1 to 20 m/s, preferably from 2 to 15 m/s or more preferably from 3 to 10 m/s is selected because the resin sheet may be deformed by the blowing gas. On the other hand, where a resin sheet of about from 0.3 to 20 mm in thickness is to be annealed with gas of 100 to 200° C. or cooled with gas of normal temperature, a gas velocity of usually from 1 to 100 m/s, preferably from 3 to 60 m/s or more preferably from 5 to 50 m/s is selected. Or where a cast metallic sheet of 5 to 100 mm in thickness is to be cooled, a gas velocity of usually from 20 to 200 m/s, preferably from 30 to 150 m/s or more preferably from 50 to 100 m/s is selected.

The gas velocity in the heat treatment apparatus according to the invention can be adjusted by a known method, which may be, for instance, to provide a damper in the flow path of the gas inlet part and to regulate its aperture.

In order to achieve heat treatment uniform in the widthwise direction of the sheet, which is the object of the invention, the gas velocity in the heat treatment apparatus according to the invention should have uniformity of gas velocity fluctuating no more than ±25% in the lengthwise direction of the nozzles, more preferably ±20% or still more preferably ±15%. The uniformity of gas velocity concerns the deviation from the average gas velocity of the nozzles in the lengthwise direction; it can be determined by, for instance, equally dividing the length of the nozzles into 10 or more segments, each to be used as the measuring point of gas velocity, averaging the gas velocities at these measuring points, and figuring out the maximum and minimum deviations from the average velocity so figured out.

The uniformity of gas velocity in the heat treatment apparatus according to the invention can be achieved by a known method described in The Japan Society of Mechanical Engineers, ed., Handbook of Mechanical Engineering, New Edition, 6th Print (in Japanese), Jul. 30, 1993, Maruzen Ltd., pp. A5-85-86; for instance, by installing metallic nets, perforated plates or flow-rectifying lattices in the nozzle boxes and attaining the desired level of uniformity.

Figure 10:
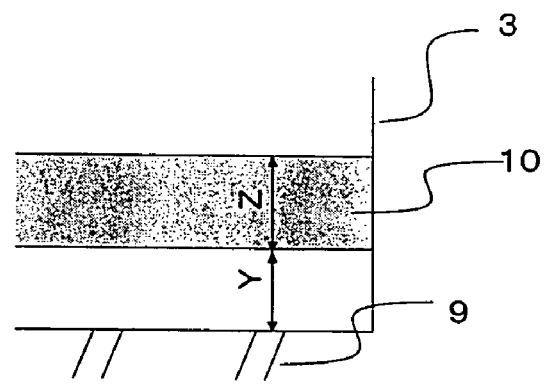
FIG. 10 schematically illustrates on a further enlarged scale the surroundings of the flow-rectifying lattice of the nozzle box of FIG. 6.

It has to be noted, however, that the reference cited above, though it provides rough guidelines for achieving uniformity, does not provide the optimal design guidelines for the nozzle boxes to be used in the present invention. In slit nozzles 9 according to the invention, the aforementioned uniformity of gas velocity can be readily achieved by installing in the nozzle boxes as shown in FIG. 10 flow-rectifying lattices 10 having a rate of aperture area of 70% or more, preferably 80% or more or more preferably 90% or more, and having an aperture pitch P of 5 to 50 mm, preferably 10 to 40 mm or more preferably 15 to 35 mm, and having a height Z which satisfies the condition of $P \leq Z \leq 10 \times P$, more preferably $1.5 \times P \leq Z \leq 8 \times P$ or more preferably $2 \times P \leq Z \leq 6 \times P$. Here, by setting the rate of aperture area to 70% or more, the pressure loss can be reduced and the energy loss can be decreased. Similarly by setting the aperture pitch P to 5 mm or more and the height Z at 10×P or less, the pressure loss can be reduced and the energy loss can be decreased. Conversely, by setting the aperture pitch P to 50 mm or less and the height Z to P or more, a sufficient flow-rectifying effect can be achieved, resulting in the attainment of the desired level of gas uniformity.

Further by so installing the flow-rectifying lattice and the nozzles 9 that the minimum distance Y between them to be $0.5 \times P \leq Y \leq 10 \times P$, more preferably $2 \times P \leq Y \leq 8 \times P$ or more preferably $3 \times P \leq Y \leq 6 \times P$, highly uniform gas can be provided. Here, if Y is set to 0.5×P or more, gas entering the nozzles is not limited by the flow-rectifying lattice and the gas flow rate can be kept uniform or, if Y is set to 10×P or less, the rectified gas flow will not be disturbed again, and no unevenness will occur in gas velocity.

Figure 9:
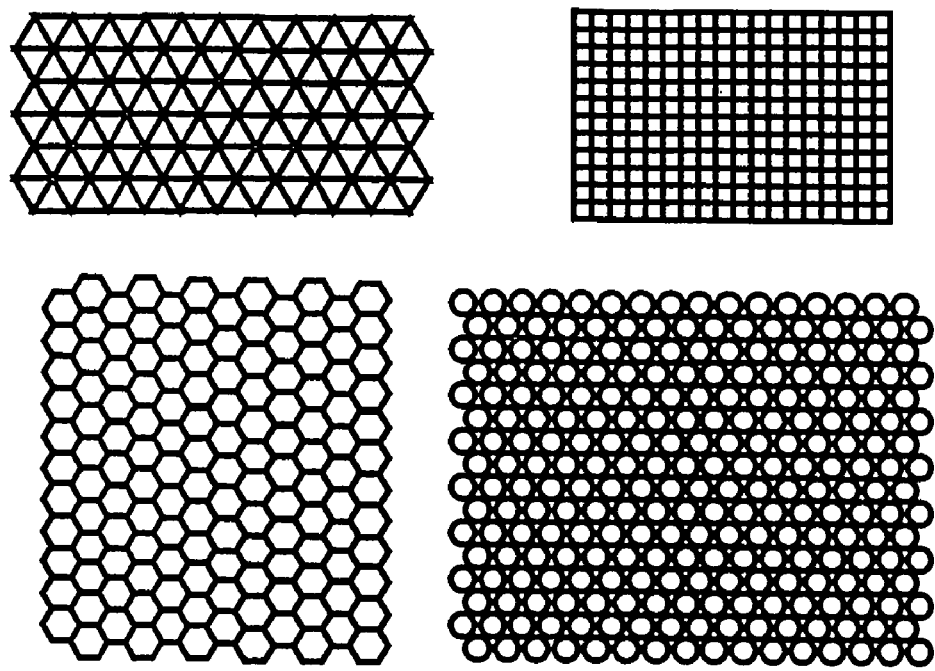
FIG. 9 illustrates an example of flow-rectifying lattice that can be used as a flow-rectifying lattice according to the invention.

There is no limitation to the shape of the flow-rectifying lattice, and it can have any known shape, such as a circular, triangular, rectangular or hexagonal shape as shown in FIG. 9.

By keeping the uniformity of gas velocity fluctuating no more than 25%, temperature unevenness in the heat treatment of the sheet can be reduced, and the desired uniformity of heat treatment in the widthwise direction can be attained. The uniformity of gas velocity for the purpose of the invention was figured out on the basis of the gas velocity measured in the position of the tip of each slit nozzle in the absence of any object to be heated.

The gas inlet part in the heat treatment apparatus according to the invention has one or a plurality of nozzle boxes at least on the top side or the bottom side of the sheet. It may have a nozzle box only on the top side of the sheet or only on the bottom side of the sheet, or nozzle boxes on both sides, over and underneath, of the sheet as shown in FIG. 1. A gas inlet part having nozzle boxes on both sides, over and underneath, of the sheet is usually preferable, because it facilitates improvement of thermal efficiency.

Where a gas inlet part having a plurality of nozzle boxes on either the top side or the bottom side of the sheet is to be adopted for the heat treatment apparatus according to the invention, it is preferable to provide appropriate spacing between the nozzle boxes by uniformly arranging the nozzle boxes or otherwise, and thereby make the gas flow via the gaps between the nozzle boxes in the heat treatment chamber to form a uniform flow.

Figure 5:
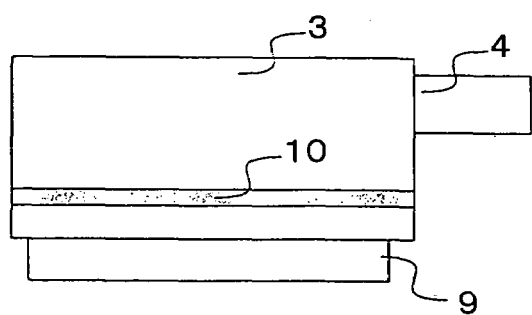
FIG. 5 schematically illustrates a side view of an example of nozzle box that can be used for the invention.
Figure 6:
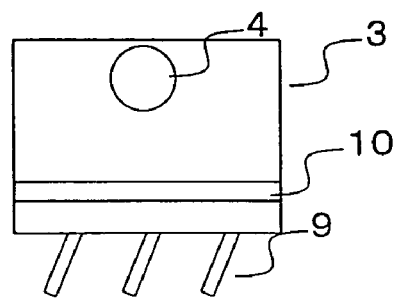
FIG. 6 schematically illustrates a front view of the nozzle box of FIG. 5.

Nozzle boxes 3 usable for the purpose of the invention may have any shape if only they are provided with slit nozzles, and their shape can be selected out of known nozzle boxes. For instance, the gas nozzles disclosed in the Japanese Patent Application Laid-Open No. 2001-54746 cited above can be used as the nozzle boxes 3 for the heat treatment apparatus according to the invention. Examples of other nozzle boxes to which the invention is applicable are shown in FIG. 5 and FIG. 6. In these drawings, reference numeral 10 denotes a member used for improving the uniformity of gas velocity, such as a metallic net, a perforated plate or a flow-rectifying lattice.

Gas blown out in a slit shape from the tips of slit nozzles is changed in flowing direction when it hits the sheet, and then flows in a direction parallel to the surface of the sheet. This impinging of gas against the sheet enables the heat transfer boundary layer near the surface of the sheet to be made sufficiently thin. This enables the heat treatment apparatus according to the invention to achieve highly efficient heat transfer. However, where the number N of slit nozzles installed on the nozzle boxes is two or more, the flow of gas blown out of each nozzle is affected by the gas flowing in parallel to the sheet which has been blown out of the other nozzle or nozzles.

By setting the distance h from the tip of each nozzle to the sheet long relative to the slit width D of the slit nozzle, and $h \leq 40 \times D$, gas blown out of the tip of the slit nozzle is not deprived of its energy of impinging the sheet by the diffusion of gas before it reaches the sheet surface, and enables the heat transfer boundary layer near the surface of the sheet to be made thin enough, making it possible to achieve efficient heat transfer. Therefore, it is preferable to so arrange the nozzle boxes of the heat treatment apparatus according to the invention to satisfy the condition of $h \leq 40 \times D$. Further, the nozzle boxes of the heat treatment apparatus according to the invention should be so arranged as satisfy the condition of more preferably $h \leq 30 \times D$ or still more preferably $h \leq 20 \times D$.

Where the nozzle box has two or more slit nozzles, if the distance h from the tip of each slit nozzle to the sheet is less than the product N×D of the number N of the slit nozzles installed on the nozzle box and the slit width D of the nozzle, i.e. $h < N \times D$, reducing h cannot make the thickness of the heat transfer boundary layer near the sheet surface thinner and heat transfer efficiency is not increased correspondingly. Therefore it is preferable to so arrange the nozzle box as to enable h to satisfy the condition of $h \geq N \times D$. It is even more preferable to satisfy the condition of $h \geq 1.5 \times N \times D$.

If the nozzle boxes are arranged in this way, the product will not be deformed by gas nor will a defective product be caused to occur by contact between the tips of the nozzles and the sheet.

Figure 7:
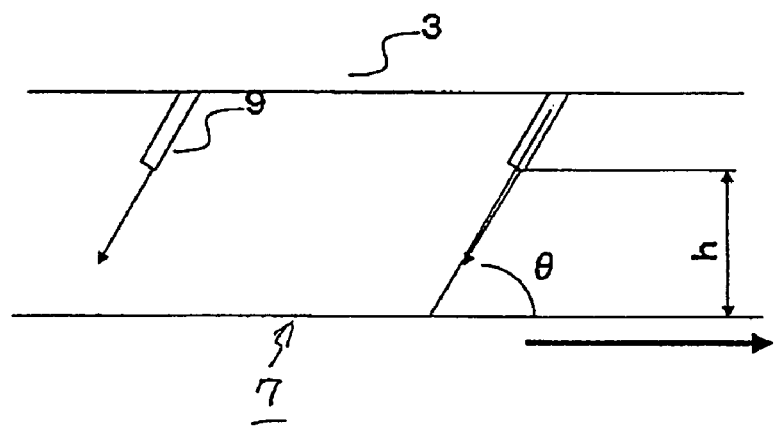
FIG. 7 schematically illustrates on an enlarged scale the surroundings of nozzles shown in FIG. 1.
Figure 8:
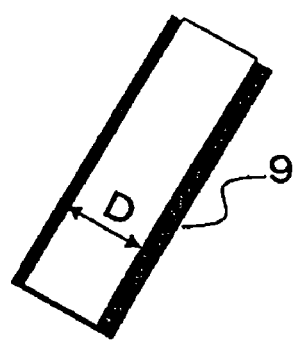
FIG. 8 schematically illustrates on a further enlarged scale the nozzles of FIG. 7.

The nozzles provided in the nozzle boxes usable for the purpose of the invention blows out gas in a slit shape from the tips of the nozzles. These nozzles are usually so arranged their lengthwise direction be substantially orthogonal to the MD direction of the heat treatment apparatus, i.e. the direction in which the sheet, which is the object of heat treatment, runs within the heat treatment chamber. FIG. 7 illustrates an outline of the arrangement of slit nozzles provided on the nozzle boxes of the heat treatment apparatus according to a preferred embodiment of the invention, and FIG. 8 illustrates the outline of the nozzles of FIG. 7 on a further enlarged scale. The nozzle angle θ (an acute angle formed by a parallel direction from the slit nozzles toward the sheet 7 to the direction of the slit nozzles and the running direction of the sheet 7) of the slit nozzles 9, though not limited specifically, is usually preferable to be in the range of 30° to 90° for efficient heat treatment. More preferably the nozzle angle θ is 40° to 90°, and the most preferable nozzle angle θ is from 40° to 80°.

The size of the slit nozzles provided on the nozzle boxes according to the invention in the lengthwise direction, though not specifically limited as long as it allows achievement of the object of the invention, is preferably sufficient or more than sufficient to cover the full width of the sheet, which is the object of heat treatment, in the TD direction because uniformity of the temperature of the sheet in the TD direction would be thereby facilitated. Nor is the slit width D of the slit nozzles specifically limited as long as it allows achievement of the object of the invention. The slit width can be determined as appropriate for the shape of the sheet, which is the object of heat treatment, or the purpose of heat treatment.

The heat treatment apparatus according to the invention has blocking members 6a and 6b which are extended between the external wall portions 2a and 2b at the two ends of the heat treatment chamber 2 and block the gaps between two side wall portions 2c and 2d, respectively, of the heat treatment chamber and side walls of the nozzle boxes. Where the gas inlet part has nozzle boxes on both sides of the sheet, over and underneath, it has a pair of blocking members 6a and 6b which are extended between the external wall portions 2a and 2b at the two ends of the heat treatment chamber 2 and block the gaps between the side walls of at least the nozzle box on the upper or lower side and the side wall portions 2c and 2d of the heat treatment chamber. It is preferable to provide a pair of blocking members 6a and 6b on each of the two sides of the nozzle boxes usually arranged over and underneath the sheet since this would facilitate uniformity of temperature in the TD direction of the sheet.

There is no specific limitation of the structure of the blocking member, and its structure may have a configuration in which the space from the side wall portions 2c and 2d of the heat treatment chamber to the side walls of the nozzle boxes opposite them are blocked by, for instance, a flat plate of a few mm in thickness, having a length between the external wall portions 2a and 2b at the two ends of the heat treatment chamber.

Where no blocking member is installed in the heat treatment chamber, flows of gas directed toward the gaps between the side walls of the nozzle boxes and the side wall portions of the heat treatment chamber are formed, gas velocity fluctuation occurring in the widthwise direction of the sheet, eventually giving rise to heating unevenness (or cooling unevenness) on the two sides of the sheet. However, installation of blocking members which extend from the side walls of the nozzle boxes 3 and block the two side wall portions of the heat treatment chamber and block the gaps between the side wall portions of the heat treatment chamber limits the flow paths of exhaust gas to the gaps between the nozzle boxes and the external wall portions at the two ends of the heat treatment chamber; where the gas inlet part has a plurality of nozzle boxes and gaps are provided between these nozzle boxes, the gas flows toward the two sides of the sheet are limited to the aforementioned gaps and gaps between the nozzle boxes restrained to enable heat treatment to be uniform in the widthwise direction of the sheet. However, where blocking members are provided on both sides of the sheet as in the apparatus described in the Japanese Patent Application Laid-Open No. 2002-69832 cited above, usually discrepancy in height occurs between the sheet and the blocking members, inviting gas flows in the widthwise direction and making it difficult to accomplish uniform heat treatment.

As described above, in the heat treatment apparatus according to the invention, a greater part of the gas blown out in a slit shape from the tips of the nozzles is changed in flowing direction when it impinges against the sheet 7, then flows in the direction parallel to the surface of the sheet, ascends or descends through the gaps between the nozzle boxes 3 and the external wall portions at the two ends of the heat treatment apparatus or, if there is a gas inlet part having a plurality of nozzle boxes and having gaps between these nozzle boxes, through the gaps between the nozzle boxes and the gaps between the nozzle boxes 3 and the external wall portions at the two ends of the heat treatment chamber, and is discharged through a gas outlet part 5.

The gas outlet part can be installed in at least one of upper and lower external wall portions 2e and 2f of the heat treatment chamber, at least one of the side wall portions 2c and 2d of the heat treatment chamber, or at least one of the external wall portions 2a and 2b at the two ends of the heat treatment chamber. Or, in order to make the flow of exhaust gas even more uniform, gas outlet parts may be provided in a plurality of positions. For instance, they can be provided in both the upper and lower external wall portions 2e and 2f of the heat treatment chamber, both the side wall portions 2c and 2d of the heat treatment chamber or both the external wall portions 2a and 2b at the two ends of the heat treatment chamber. Where there is a limit to the height of the heat treatment chamber, gas outlet parts can be provided in the external wall portions 2a and 2b at the two ends of the heat treatment chamber or, if there is no such limit, they can be provided in any of the positions mentioned above.

Gas discharged from the gas outlet parts, though it may be sometimes discarded externally, is usually recovered and, then adjusted to a prescribed temperature again, is fed again to the gas inlet part for recycling by using a fan or otherwise. If, on this occasion, gas is supplied from outside and mixed with the recovered gas, and the mixture is fed to the gas inlet part or part of the recovered gas is discharged outside, the essentials of the present invention will be affected in no way.

A plurality of heat treatment apparatuses according to the invention can be installed side by side. In this case, gas supply to the gas inlet parts of the heat treatment apparatuses may either use the same line or a separate line for each. Also, individual control may be performed among the individual heat treatment chambers. Where each gas inlet part has a plurality of nozzle boxes, each nozzle box may be individually controlled.

Similarly, the gas outlet parts may either use the same line or a separate line for each. Also, individual control may be performed among the individual heat treatment chambers.

The heat treatment apparatus according to the invention, though it may be an open system, may preferably be a semi-sealed system for greater energy efficiency. Also, in order to prevent gas from leaking out of the sheet outlet and inlet provided in the external portions at the two opposite ends and external atmosphere from invading into the heat treatment chamber, a sealing chamber having a sheet outlet and inlet may be further provided outside the external portions at the two opposite ends of the heat treatment chamber. There is no specific limitation to the configuration of the sealing chamber, but any appropriate one can be selected out of known configurations. Further to increase the sealing tightness of the sheet outlet and inlet for instance, a known sealing structure, such as the one described in the Japanese Patent Application Laid-Open No. 5-106964 cited above, can as well be used.

EXAMPLES

The present invention will be described below in further detail with reference to examples thereof.

The gas velocity and the uniformity of gas velocity in the lengthwise direction of the nozzles were evaluated by the following methods.

[Gas Velocity]

The gas velocity in these examples was measured with a air velocity meter (a product of Kanomax Japan Inc., Anemomaster Model 6162 by commercial name) by bringing its probe close to the tips of the nozzles at every 100 mm intervals in the lengthwise direction of the nozzles.

[Uniformity of Gas Velocity in Lengthwise Direction of Nozzles]

The uniformity of gas velocity in the lengthwise direction of the nozzles in these examples was assessed by measuring the gas velocity at 30 points at equal intervals in the lengthwise direction of the nozzles and, on the basis of the average of the gas velocities so measured, computing the maximum and minimum deviations of the gas velocity.

The value of an average heat transfer coefficient U in these examples was computed on the basis of the following equations from the measured inlet temperature and output temperature of the resin sheet surface in these examples.

Thus, an average heat transfer coefficient U was supposed and, by using this supposed average heat transfer coefficient U, the resin sheet temperature at the outlet of the apparatus was computed on the basis of Equation 1 under the boundary conditions of Equations 2 to 4, and the supposed average heat transfer coefficient U to make the difference between this computed value and the actually measured value 0.5° C. or below was used as the average heat transfer coefficient of these examples. In this process, the temperature distributions on the top and bottom sides of the resin sheet, which is the object of heating, were supposed to be symmetric with respect to the central position in the direction of thickness.

$$\rho C_p \frac{\partial T}{\partial t} = \lambda \frac{\partial^2 T}{\partial x^2} \qquad (eq.\ 1)$$

$$t = 0;\ T = T_0 \qquad (eq.\ 2)$$

$$\left.\frac{\partial T}{\partial x}\right|_{x=0} = 0 \qquad (eq.\ 3)$$

$$\left.\rho C_p \frac{\partial T}{\partial t}\right|_{x=\delta} = U(T_G - T_\delta) \qquad (eq.\ 4)$$

In the foregoing equations,
  $\lambda$: thermal conductivity of the object of heating
  $\rho$: density of the object of heating
  $C_\rho$: specific heat of the object of heating
  T: temperature of the object of heating
  $T_0$: initial temperature of the object of heating
  $T_G$: gas temperature
  $T_\delta$: surface temperature of the object of heating
  t: time past since reaching the inlet to the air heating device
  x: distance from the central position of the object of heating in the direction of thickness
  x=0: central position of the object of heating
  x=$\delta$: surface of the object of heating
  U: heat transfer coefficient

Example 1

An outline of the heat treatment apparatus used in this example is illustrated in FIG. 1 and FIG. 2.

The gas inlet part of the heat treatment apparatus used in this example has the nozzle boxes 3 of the same shape over and underneath the sheet 7. The body of each nozzle box 3 has a rectangular shape, measuring 1400 mm long in the MD direction, 3200 mm wide in the TD direction and 800 mm in height, and has 10 slit nozzles arranged at equal intervals, of which the first slit is in a position of 100 mm from the forward end of the nozzle box and the 10th slit is in a position 100 mm from the backward end of the same. The slit nozzles measure 3200 mm in the lengthwise direction, 3 mm in slit width D and 40 mm in the distance h from the slit nozzle tip to the sheet, and are so arranged that the lengthwise direction of the nozzles be orthogonal to the running direction of the sheet and the nozzle angle, which is an acute angle formed between the direction from the slit nozzles toward the sheet, the direction being parallel to that of the slit nozzles, and the running direction of the sheet, be 60°.

The heat treatment chamber measures 2000 mm long from the external wall portion 2a at the forward end to the external wall portion 2b at the backward end and 4000 mm long from the side wall portion 2c to the side wall portion 2d; the distance from each of the side wall portions 2c and 2d of the heat treatment chamber to the side wall of the opposite nozzle box is 400 mm, and the distance from each of the external wall portions 2a and 2b at the two ends of the heat treatment chamber to the end wall of the opposite nozzle box is 300 mm.

The gaps between the side wall portions 2c and 2d of the heat treatment chamber and the side walls of the upper and lower nozzle boxes opposite them are respectively blocked with blocking plates 6a and 6b measuring 400 mm in width and 2000 mm in length. The blocking plates are so arranged that the blocking plate provided between the side walls of the upper nozzle box and the side walls of the heat treatment chamber be in a position of 400 mm from the upper end of the nozzle box body and the blocking plate provided between the side walls of the lower nozzle box and the side walls of the heat treatment chamber be in a position of 400 mm from the lower end of the nozzle box body.

Gas flowing through the gas inlet 4 of the gas inlet part was so controlled that the velocity of the gas flows blown out of the slit nozzles of the nozzle boxes 3 over and underneath the sheet 7 be 10 m/s and the internal temperature of the nozzle boxes 3 be 100° C., and the gas admitted through the nozzle tips into the heat treatment chamber was discharged through the gas outlet part 5.

In each nozzle box was so arranged a flow-rectifying lattice, which was a regular hexagonal lattice measuring 20 mm in pitch P and 50 mm in length Z and having a rate of aperture area 94.2%, that its distance Y from the nozzles be 50 mm. Herein P (20 mm)<Z (50 mm)<10×P (200 mm) and 0.5×P (10 mm)<Y (50 mm)<10×P (200 mm), and the uniformity of the gas velocity in the lengthwise direction of the nozzles was ±8%.

Heat treatment was performed by running a resin (PMMA) sheet of 3000 mm in width and 5 mm in thickness, held between endless SUS belts of 3100 mm in width and 1.5 mm in thickness through this heat treatment apparatus along a linear route connecting the sheet inlet and outlet positioned in the central part of the space between the upper nozzle box and the lower nozzle box. The resin sheet having a uniform temperature of 30° C. was fed to the sheet inlet 8a at a speed of 2 m/min, the surface temperature of the endless SUS belts was measured with contact type thermocouples, provided at the sheet outlet 8b in positions of division of its width into 10 equal portions in the widthwise direction of the resin sheet, and temperature unevenness was figured out from the deviations of the resultant measurements from their average.

The average surface temperature of the endless SUS belts at the resin sheet outlet was 46° C., and the temperature unevenness in the widthwise direction was within ±1° C. The value of the average heat transfer coefficient U then was 40 W/(m²·K).

Example 2

Figure 3:
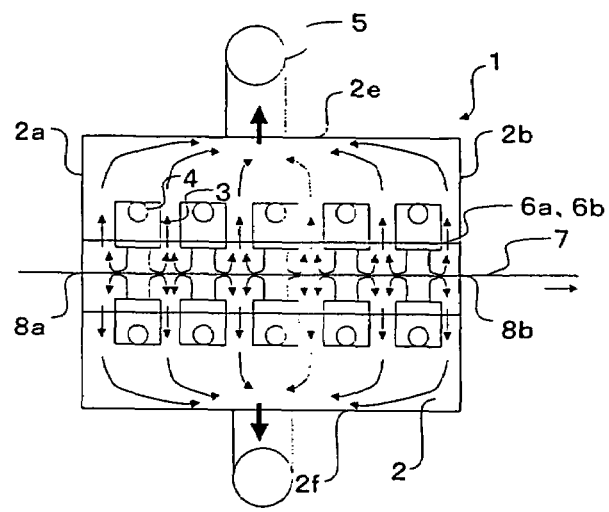
FIG. 3 schematically illustrates a longitudinal section of a heat treatment apparatus in another embodiment of the present invention.
Figure 4:
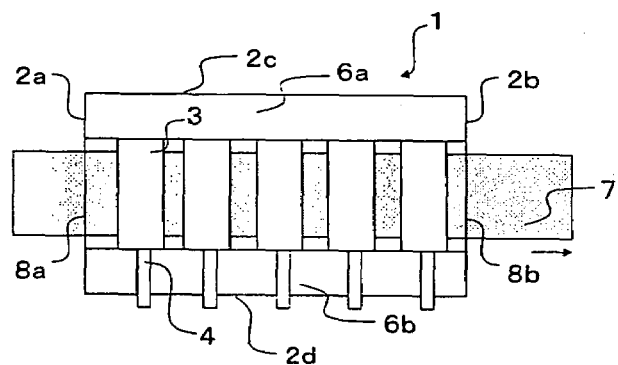
FIG. 4 schematically illustrates a plan of the heat treatment apparatus of FIG. 3.

An outline of the heat treatment apparatus used in this example is illustrated in FIG. 3 and FIG. 4.

Heat treatment was performed in the same way as in the case of Example 1 except that it used a gas inlet part having five nozzle boxes each of the same shape over and underneath the sheet, in which the body of each nozzle box 3 had a rectangular shape, measuring 300 mm long in the MD direction, 3200 mm wide in the TD direction and 800 mm in height, and had two slit nozzles so arranged that the first slit was in a position of 100 mm from the forward end of the nozzle box and the second slit was in a position of 100 mm from the backward end of the same, the nozzle boxes 3 being arranged with gaps of 200 mm between them. The uniformity of the gas velocity in the lengthwise direction of the nozzles was ±7%.

The average temperature at the resin sheet outlet was 45° C., and the temperature unevenness in the widthwise direction was within ±0.5° C. The value of the average heat transfer coefficient U then was 37 W/(m²·K).

Example 3

Heat treatment was performed in the same way as in the case of Example 1 except that it used a PMMA film of 150 μm in thickness, instead of the resin sheet of 5 mm in thickness held between SUS belts of 1.5 mm in thickness, and the feed speed was 20 m/min.

The average temperature of the PMMA film at the outlet was 87° C., and the temperature unevenness in the widthwise direction was within ±0.5° C. The value of the average heat transfer coefficient U then was 40 W/(m²·K).

Example 4

Heat treatment was performed in the same way as in the case of Example 1 except that the distance h from the tips of the slit nozzles to the sheet was set to 20 mm. The average temperature of the resin sheet at the outlet was 47° C., and the temperature unevenness in the widthwise direction was within ±1.0° C. The value of the average heat transfer coefficient U then was 42 W/(m²·K). Then, h (20 mm)<40D (120 mm). Further, h (20 mm)<N×D (30 mm)<30×D (90 mm).

Example 5

Heat treatment was performed in the same way as in the case of Example 1 except that nozzle boxes whose slit nozzles are set to a nozzle angle of 20° are used. The uniformity of the gas velocity in the lengthwise direction of the nozzles was ±7%. The average temperature of the resin sheet at the outlet was 40° C., and the temperature unevenness in the widthwise direction was within ±1.0° C. The value of the average heat transfer coefficient U then was 22 W/(m²·K).

Example 6

Heat treatment was performed in the same way as in the case of Example 1 except that the distance h from the tips of the slit nozzles to the sheet was set to 150 mm. The average temperature of the resin sheet at the outlet was 35° C., and the temperature unevenness in the widthwise direction was within ±1.0° C. The value of the average heat transfer coefficient U then was 12 W/(m²·K). Then, h (150 mm)>40×D (120 mm). Further, N×D (30 mm)<30×D (90 mm)<h (150 mm).

Example 7

Heat treatment was performed in the same way as in the case of Example 1 except that no flow-rectifying lattice 10 was fitted in the nozzle boxes, and instead perforated plates with zigzag-arranged round holes of 60 degrees, 1.5 mm in thickness, 8 mm in hole bore, 20 mm in pitch and 14.4% in rate of aperture area were installed in three positions where the distance Y from the nozzles was 50 mm, 75 mm and 100 mm. The uniformity of the gas velocity in the lengthwise direction of the nozzles was ±11%.

The average surface temperature of the endless SUS belts at the resin sheet outlet was 46° C., and the temperature unevenness in the widthwise direction was within ±1.5° C. The value of the average heat transfer coefficient U then was 40 W/(m²·K).

Comparative Example 1

Heat treatment was performed in the same way as in the case of Example 1 except that no blocking plates 6a and 6b were fitted to the heat treatment chamber. The average temperature of the resin sheet at the outlet was 45° C., and the temperature unevenness in the widthwise direction was ±3.0° C. The value of the average heat transfer coefficient U then was 37 W/(m²·K).

Comparative Example 2

Heat treatment was performed in the same way as in the case of Example 2 except that no blocking plates 6a and 6b were fitted to the heat treatment chamber. The average temperature of the resin sheet at the outlet was 44° C., and the temperature unevenness in the widthwise direction was ±2.5° C. The value of the average heat transfer coefficient U then was 34 W/(m²·K).

Comparative example 3

Heat treatment was performed in the same way as in the case of Example 1 except that no flow-rectifying lattice 10 was fitted to the nozzle boxes. The uniformity of the gas velocity in the lengthwise direction of the nozzles was ±30%. The average temperature of the resin sheet at the outlet was 46° C., and the temperature unevenness in the widthwise direction was ±3.0° C. The value of the average heat transfer coefficient U then was 40 W/(m²·K).

INDUSTRIAL APPLICABILITY

As hitherto described, the use of the heat treatment apparatus according to the invention can achieve heat treatment with almost no temperature unevenness in the widthwise direction of the sheet, and accordingly is useful for industrial purposes.

The invention claimed is:

1. A heat treatment apparatus comprising:
   at least a heat treatment chamber having an inlet and an outlet for a sheet in external wall portions at its two opposite ends;
   a gas inlet part for letting gas, which is a thermal medium, into the heat treatment chamber;
   a gas outlet part for discharging the gas out of the heat treatment chamber; and
   carrying means for running the sheet along a linear route connecting the sheet inlet and outlet within the heat treatment chamber,
   wherein
   said gas inlet part has nozzle boxes which blow out gas in a slit shape in a direction substantially orthogonal to the running direction of said sheet, whose lengthwise direction is arranged to be substantially orthogonal to the running direction of said sheet, and whose lengthwise size is greater than the width of the sheet,
   said nozzle boxes blow out gas having a uniformity of gas velocity fluctuating no more than ±25% in the lengthwise direction of the nozzles,
   said heat treatment chamber has blocking members which are extended between the external walls at the two ends of the heat treatment chamber and block the gaps between the side wall portions of the heat treatment chamber and the side walls of the nozzle boxes, and
   flow-rectifying lattices whose rate of aperture area is 70% or more, whose aperture pitch P is from 5 to 50 mm and whose height Z satisfies the condition of $P \leq Z \leq 10 \times P$ are installed within said nozzle boxes.

2. The heat treatment apparatus according to claim 1, wherein said flow-rectifying lattices are so installed that a minimum distance Y from them to the nozzles be $0.5 \times P \leq Y \leq 10 \times P$.

3. A heat treatment apparatus comprising:
   at least a heat treatment chamber having an inlet and an outlet for a sheet in external wall portions at its two opposite ends;
   a gas inlet part for letting gas, which is a thermal medium, into the heat treatment chamber;
   a gas outlet part for discharging the gas out of the heat treatment chamber; and
   carrying means for running the sheet along a linear route connecting the sheet inlet and outlet within the heat treatment chamber,
   wherein
   said gas inlet part has nozzle boxes which blow out gas in a slit shape in a direction substantially orthogonal to the running direction of said sheet, whose lengthwise direction is arranged to be substantially orthogonal to the running direction of said sheet, and whose lengthwise size is greater than the width of the sheet,
   said nozzle boxes blow out gas having a uniformity of gas velocity fluctuating no more than ±25% in the lengthwise direction of the nozzles; and said heat treatment chamber has blocking members which are extended between the external walls at the two ends of the heat treatment chamber and block the gaps between the side wall portions of the heat treatment chamber and the side walls of the nozzle boxes, and said nozzle boxes are so arranged as to satisfy the condition of $h \leqq 40 \times D$, where D is the slit width of the slit nozzles and h is the distance from the tips of the slit nozzles to said sheet.

4. The heat treatment apparatus according to claim 3, wherein said nozzle boxes are provided with N slit nozzles, where N is not smaller than 2 but not greater than 29, and are so arranged as to satisfy the condition of $N \times D \leqq h \leqq 30 \times D$.

* * * * *